United States Patent [19]

Van Zantwyk

[11] 4,372,760

[45] Feb. 8, 1983

[54] APPARATUS FOR REMOVING PARTICULATE MATTER FROM A GASEOUS STREAM

[75] Inventor: Conrad G. Van Zantwyk, Roselle, N.J.

[73] Assignee: Oxy-Dry Corporation

[21] Appl. No.: 895,115

[22] Filed: Apr. 10, 1978

Related U.S. Application Data

[63] Continuation of Ser. No. 710,642, Aug. 2, 1976, abandoned, which is a continuation of Ser. No. 461,593, Apr. 17, 1974, abandoned, which is a continuation of Ser. No. 234,891, Mar. 15, 1972, abandoned.

[51] Int. Cl.³ .............................................. B01D 47/02
[52] U.S. Cl. ........................................ 55/227; 55/95; 55/244; 261/119 R
[58] Field of Search ................... 55/95, 223, 227, 239, 55/244–256; 261/119 R

[56] References Cited

U.S. PATENT DOCUMENTS

| | | | |
|---|---|---|---|
| 418,542 | 12/1889 | Stockwell | 55/252 |
| 848,340 | 3/1907 | Bentz | 55/95 |
| 899,628 | 9/1908 | Sepulchre | 55/244 |
| 1,001,739 | 8/1911 | Dovel | 261/119 R |
| 1,341,872 | 6/1970 | Anderson | 261/119 R |
| 1,684,068 | 9/1928 | Moon | 55/248 |
| 1,817,265 | 8/1931 | Dando | 55/244 |
| 2,585,440 | 2/1952 | Collins | 55/227 |
| 2,818,135 | 12/1957 | White | 55/244 |
| 3,395,042 | 7/1968 | Herbert, Jr. | 15/1.5 |
| 3,546,851 | 12/1970 | Hardison et al. | 55/227 |
| 3,680,528 | 8/1972 | Sanders | 118/50 |
| 3,793,809 | 2/1974 | Tomany et al. | 55/90 |

FOREIGN PATENT DOCUMENTS 240974 10/1925 United Kingdom ................. 55/246

*Primary Examiner*—Norman Yudkoff
*Attorney, Agent, or Firm*—Leydig, Voit, Osann, Mayer and Holt, Ltd.

[57] ABSTRACT

A method and apparatus for removing particulate matter from a gaseous stream, such as air, includes a hood having an inlet to receive the incoming stream containing the particulate matter and an open base spaced within defined limits from a receptacle containing a particle-entrapping liquid. Means for maintaining the liquid at the desired level are also disclosed.

2 Claims, 10 Drawing Figures

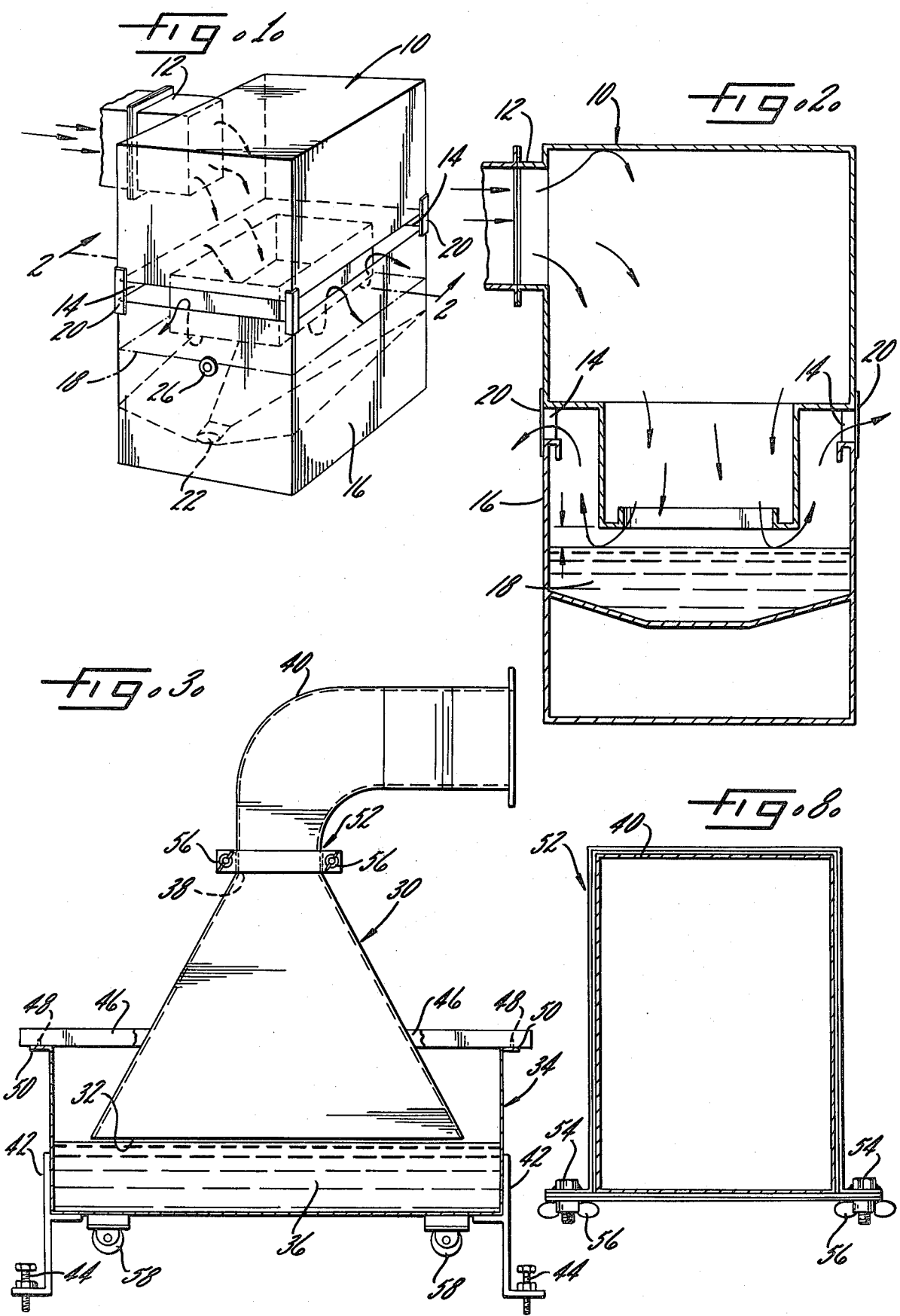

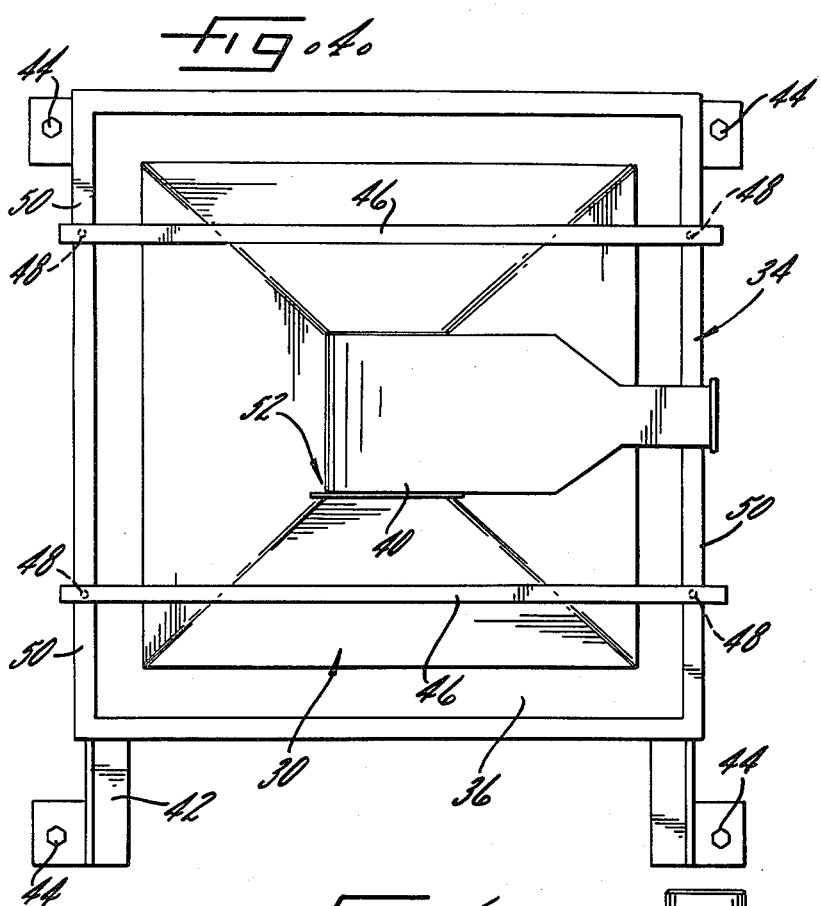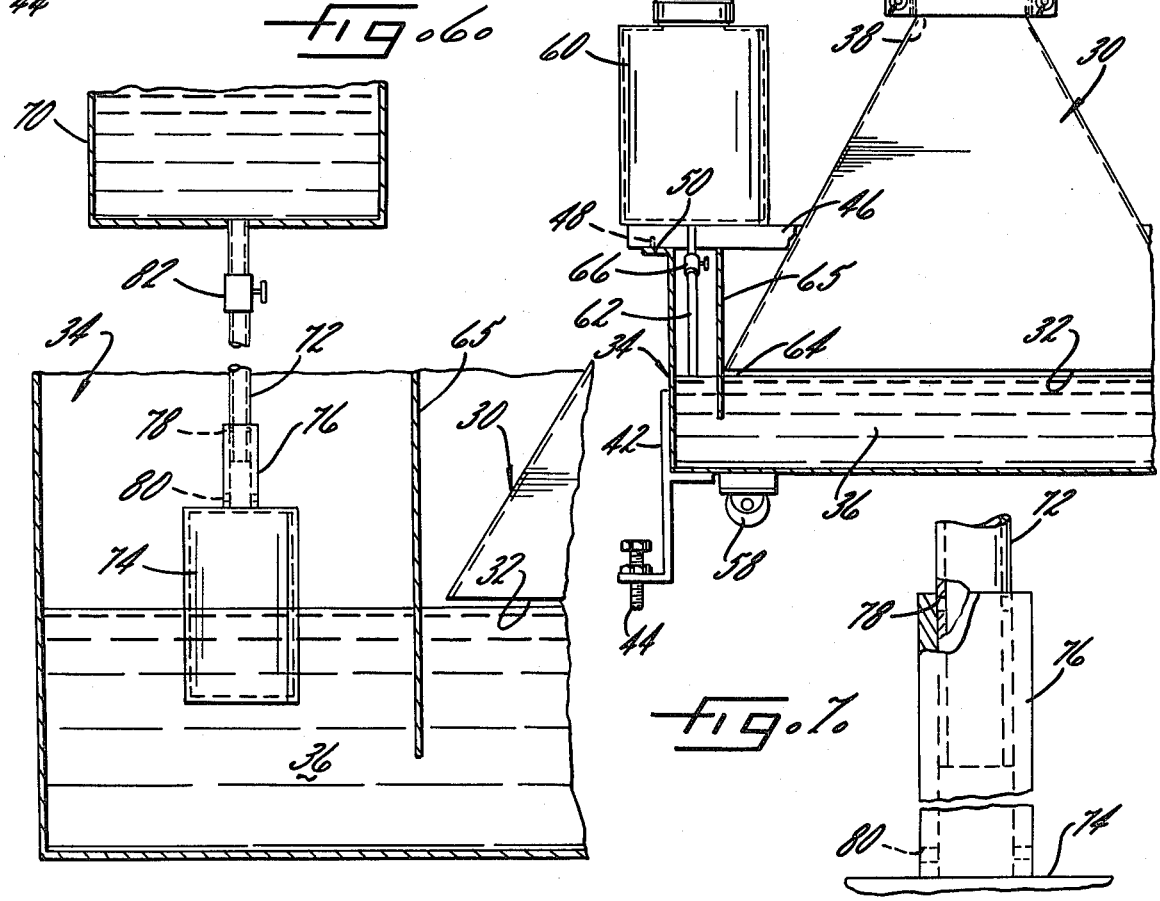

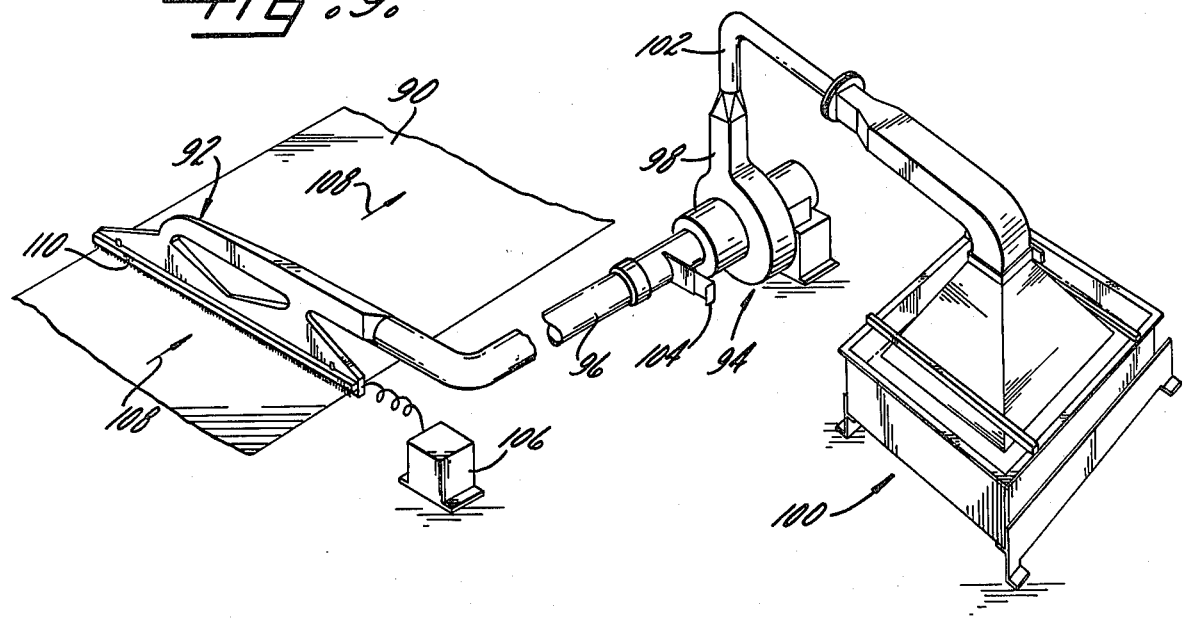
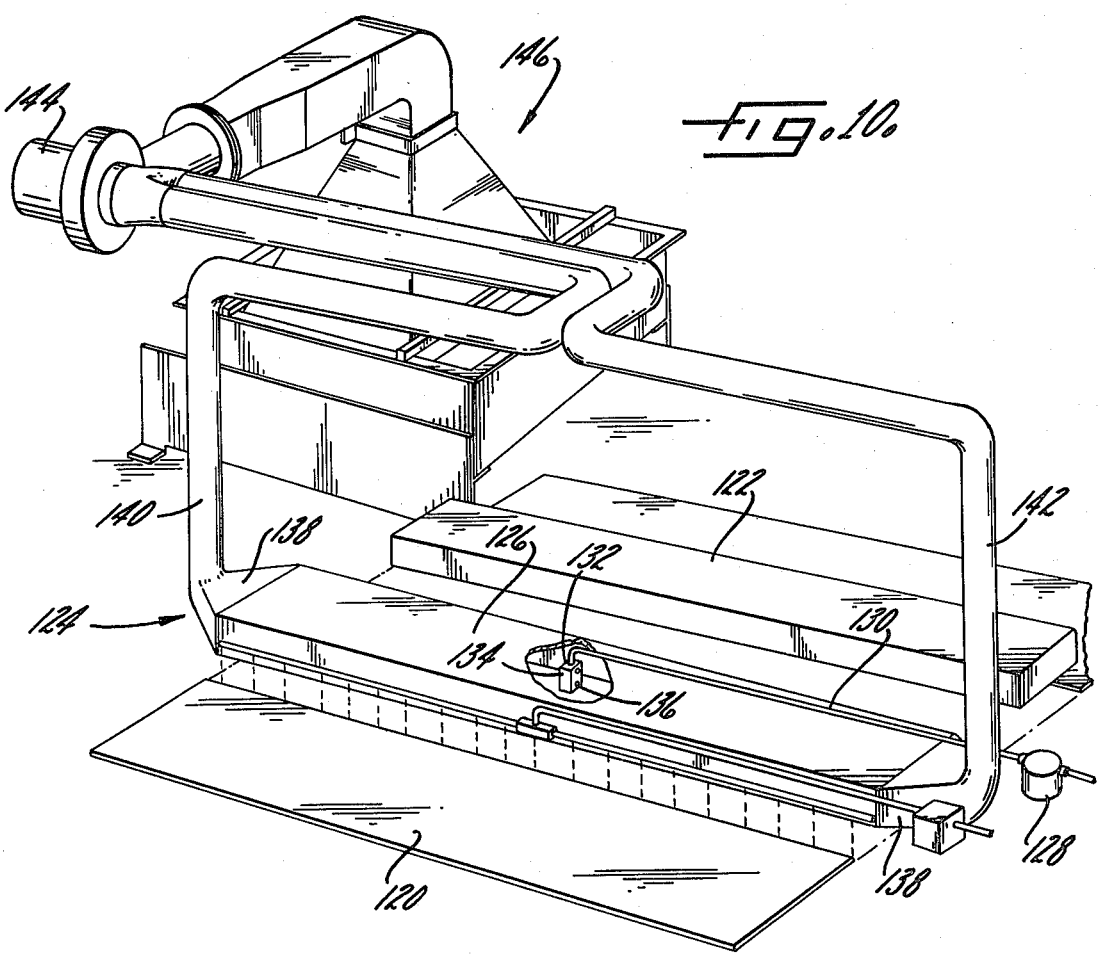

APPARATUS FOR REMOVING PARTICULATE MATTER FROM A GASEOUS STREAM

This is a continuation of application Ser. No. 710,642, filed Aug. 2, 1976 which in turn is a continuation of application Ser. No. 461,593 filed Apr. 17, 1974 which in turn is a continuation of application Ser. No. 234,891 filed Mar. 15, 1972, all abandoned.

This invention relates to particulate matter separation and, more particularly, to a method and apparatus for removing particulate matter from gaseous streams such as air.

In the printing field, for example, various types of auxiliary equipment are employed which generate, due to their functions such as cleaning and the like, air streams containing lint, paper particles, dust and other particulate material that must be separated before the air stream can be vented to the atmosphere. As a specific example, U.S. Pat. No. 3,395,042 discloses an apparatus for cleaning the surface of paper, board, webs, and the like which includes an evacuator that produces a vacuum within a head communicating with the surface of the paper sheet being cleaned. Foreign particles such as lint, paper dust and the like are removed from the surface of the paper sheet and are transported in an air stream through the head and into a collector bag. Typically, the collector bag comprises a cloth mesh bag which is air permeable so as to allow the air to pass therethrough while trapping the particulate matter. The bag is typically sized with respect to the volume of air throughput.

The effective operation of the paper-cleaning apparatus is dependent upon the ability of the air to pass through the bag without any significant resistance. Stated another way, to efficiently clean the sheet, it is necessary to maintain the vacuum at a relatively high level. And, while a collector bag may function without difficulty, particularly for short periods of time, it has been noted that the bags, in practice, have a tendency to clog up. Thus, fine dust and other particles become entrapped rather quickly in the interstices of the cloth mesh bag, which considerably increases the resistance to air flow and decreases the permeability of the bag. As the bag begins to clog, the efficiency of the apparatus correspondingly decreases; and, eventually, it becomes necessary to shut the apparatus down and change or clean the bag.

As a further specific example, it is often desirable or necessary in printing and other fields to deposit a powder profile such as starch on a surface to prevent the offset of ink and/or to provide slip between adjacent surfaces when stacked. Some of the powder released from the types of apparatus used to accomplish the deposition of a powder profile generally remains airborne due to air turbulence or the like. Thus, airborne powder collects on the equipment, the walls, ceiling and floor of the facility and even on the individuals in the area. Much effort has in the past been directed towards developing apparatus which is suitable for collecting all or most of this powder. Generally, however, the solutions have either proven expensive, have effected the quality of the powder application itself, or utilization has been difficult because of the limited space available, particularly on presses, for such equipment.

Copending application, Ser. No. 24,523 to Sanders, filed Apr. 1, 1970, assigned to the assignee of the present invention, discloses a compact apparatus capable of removing a large portion of the excess powder without significantly effecting the desired application of the powder to the sheet. The apparatus includes a manifold to collect the powder which is then transported into a powder collector comprising an exhaust trap such as a woven cotton bag that is sufficiently porous to allow the air to be exhausted into the atmosphere. In this dust collecting apparatus, as was the case with the hereinbefore described paper-cleaning apparatus, the effective operation of the equipment is dependent upon maintaining an effective throughput of air. Accordingly, if the permeability of the woven bag is diminished to any significant extent, as by the clogging of the pores of the bag by the powder particles, the ability of the apparatus to perform the dust collection is seriously affected.

It is accordingly an object of the present invention to provide a method and apparatus for removing particulate material from a gaseous stream which is characterized by effective operation without creating any significant reduction in the throughput of the stream being treated.

Another object lies in the provision of a compact apparatus capable of being used with auxiliary printing equipment.

A further object provides apparatus of the herein described type that is sufficiently versatile to allow usage with a variety of types of auxiliary equipment having differing gaseous stream throughputs.

A still further and more specific object of the present invention is to provide an apparatus of the herein described type which may be used in connection with a paper-cleaning apparatus requiring for effective operation no significant diminution of the air throughput generated by such apparatus.

Yet another specific object lies in the provision of such an apparatus which may be used with a dust collecting apparatus without effecting the functional operation thereof.

Other objects and advantages of the present invention will be apparent from the following description and the accompanying drawings, in which:

FIG. 1 is a diagrammatic perspective view of one embodiment of the apparatus of the present invention;

FIG. 2 is a cross-sectional view, taken along line 2—2 of FIG. 1 and further illustrating the FIG. 1 embodiment;

FIG. 3 is a side elevation view of another embodiment of the apparatus of the present invention, and partly broken away to show the spatial relationship between the plenum directing the impure air stream and the particulate matter entrapping liquid;

FIG. 4 is a top elevation view of the apparatus shown in FIG. 3 and further illustrating the spatial relationship between the plenum and its support brackets which are carried by the receptacle containing the particle entrapping liquid;

FIG. 5 is a side elevation view and schematically showing one mode for maintaining the appropriate liquid level;

FIG. 6 is a schematic view and showing a float structure for maintaining the particle-entrapping liquid at the desired level;

FIG. 7 is a detailed view of a portion of the apparatus shown in FIG. 6 and illustrating the means by which downward movement of the float allows additional liquid to be supplied;

FIG. 8 is a detail view and further illustrating the quick release clamp shown in FIG. 3 for joining the plenum and the duct communicating therewith;

FIG. 9 is a schematic view and showing use of the dust separating apparatus of the embodiment of FIGS. 3 and 4 in connection with a paper-cleaning apparatus; and FIG. 10 is a schematic view similar to FIG. 9, except illustrating the use of the dust separating apparatus of the present invention in connection with a dust-collecting apparatus.

While the invention is susceptible of various modifications and alternative forms, certain specific embodiments thereof have been shown by way of example in the drawings which will be described in detail herein. It should be understood, however, that it is not intended to limit the invention to the particular forms disclosed but, on the contrary, the intention is to cover all modifications, equivalents and alternatives falling within the spirit and scope of the invention. Thus, while the illustrative embodiments show employment of the apparatus and method of the present invention in connection with auxiliary equipment generally used in the printing field, it should be appreciated that the present invention is equally applicable to utilization with any apparatus wherein particulate matter must be removed from a gas stream, and may find particular advantageous use in connection with any type of apparatus which generates such a stream yet requires, for its effective operation, that the throughput rate of the stream be not diminished by any significant amount. Similarly, while the use of the present invention in connection with the illustrated paper-cleaning and dust collecting apparatus typically involve decreasing the velocity of the gaseous stream to effect particle separation, it should be apparent that the invention is equally applicable to use with apparatus wherein the velocity of the gaseous stream must be adjusted by increasing the velocity.

The present invention thus provides apparatus for removing particulate material from a gas stream which comprises, in general, an open based hood or plenum having an inlet to receive the gas stream containing the particulate material and a liquid reservoir closely positioned adjacent the open base of the hood for entrapping the particulate matter as the escaping gas stream exits to the atmosphere. Variables such as the position of the gas stream inlet, the size and shape of the plenum, the distance between the open base of the plenum and the liquid level and the configuration of the container for the liquid are all desirably coordinated to provide for efficient separation of the particles from the stream without affecting its throughput.

Turning now to the drawings, FIGS. 1 and 2 illustrate one embodiment of the apparatus of the present invention. To receive the gas stream containing the undesired particulate matter, there is provided a hood 10 having an inlet 12 for the gas stream and an open base 14 through which the gas stream is allowed to escape into the atmosphere. To entrap the particulate matter, there is provided a tank generally indicated at 16 and containing the entrapping liquid 18, such as water. The hood rests on blocks, indicated at 20, which are adjustable, so that the distance between the base of the hood and the liquid level can be varied as desired to maximize the entrapment of the particulate matter in the liquid.

The hood should be sized so that the air velocity drops sufficiently to trap the particulate matter in the liquid as the air, freed from the particulate impurities, exits between the bottom of the hood and the liquid. The distance between the walls of the hood adjacent its base and the walls of the tank or reservoir should be sufficiently great so that the turbulence at the tank walls is minimized. Moreover, the walls of the liquid reservoir should extend above the liquid level a distance sufficient to contain the waves in the liquid created by the contact of the gas stream on the liquid surface.

The tank may be provided with a tap or drain 22 so that cleaning may readily be carried out. The height of liquid carried in the tank should be coordinated with the amount of particulate matter expected to be collected so as to make the frequency of replacing the liquid and cleaning tank as infrequent as desired. It should be similarly appreciated that the walls of the tank could be suitably contoured, if desired, so as to minimize the effect of the waves created in the liquid.

FIGS. 3 and 4 show another embodiment of the apparatus of the invention. As shown, a hood or plenum 30 is provided to accept the gas stream containing the undesired particulate matter and has an open base 32 positioned above a receptacle or tank 34, containing a liquid 36 to entrap the particulate matter.

To assist in achieving maximum separation, it is necessary to employ a plenum with a size and configuration such that the gas stream is allowed to expand sufficiently so that, at the base of the plenum, the particles contained in the stream will be entrapped in the liquid with little or no tendency to follow the gas stream venting into the atmosphere. Thus, the principal requirement is that the size of the plenum be such as to adjust the velocity of the gas stream from the plenum inlet to the outlet or base to a level where separation of the particles will take place. It has been found that the velocity should be maintained below about 3000 ft./min., preferably between about 1300 to 3000 ft./min.

In accordance with one aspect of this embodiment of the present invention, it is desirable to allow the gas stream to expand in a generally uniform fashion; and this may be achieved by employing a plenum, which is flared. It has also been found advantageous to use a plenum configuration which achieves essentially uniform distribution of the gas stream as it exits the plenum and contacts the liquid. This allows optimum usage of the entire surface of the entrapping liquid and reduces the possibility that a particle will rebound from the surface of the liquid and become again entrained in the gas stream. In this connection, when a flared plenum is used having a rectangular inlet, indicated at 38, a square plenum base has been found advantageous. Other geometrical shapes can, of course, be employed; and, indeed, when the inlet is other than rectangular, it may well be that superior results can be obtained by a base having a shape other than square.

In addition to the flared construction of the plenum and the shape of its base, it is also important that the plenum height be sufficient to allow the desired gas stream distribution to be achieved and the turbulence in the liquid minimized. The height of the plenum used and the relative distance between the inlet and the base will of course determine the rate of expansion or flare of the plenum. A formulation for determining the minimum height will be set forth hereinafter in connection with a representative embodiment which may be used with the paper-cleaning apparatus shown in FIG. 9 or the dust collecting apparatus shown in FIG. 10.

It has also been found desirable, when used with a centrifugal blower or any other apparatus in which the gas stream generated is not uniformly distributed, to avoid having a direct connection between the plenum inlet and the blower or other apparatus which feeds the particle-containing stream to the plenum. Accordingly, superior gas distribution in the plenum has been achieved by using a conventional elbow connection 40 (FIG. 3) to connect the blower outlet (not shown) with the plenum inlet 38.

The liquid serving as the entrapping medium can be water; however, due to turbulence and simply exposure to ambient air, evaporation will occur. Accordingly, it is within the scope of the present invention to use liquids with evaporation rates less than water or to add chemicals to water to lessen the rate of evaporation. It should, however, be appreciated that the resulting liquid should have a surface tension which will allow the particles to penetrate and become entrapped as opposed to rebounding so as to again becoming entrained in the escaping gas stream. It should be further appreciated that whatever liquid is used should not be allowed to become overly saturated with particles since the efficiency of operation is reduced.

In accordance with the present invention, it is critical that the distance between the liquid surface and the plenum base be kept within carefully controlled limits so that the desired particle separation will be effected. The distance employed is dependent upon the velocity of the gas as it exits through the plenum base and the size and amount of the particles being separated; however, for most applications, it has been found satisfactory to set this distance at about $\frac{3}{8}$ inch or less (the distance being determined as static conditions prior to throughput of the gas stream; throughput will increase this distance somewhat), with no significant improvement in result being evident when the distance is decreased to about $\frac{1}{4}$ inch.

The liquid reservoir 34 is carried by supports 42, and the assembly may rest on the floor via adjustable screws 44, which provide a means for leveling the liquid surface relative to the plenum base to insure that the desired path of air is relatively uniform.

The plenum 30 is desirably held in place via cross brackets 46, which are held in pegs 48 an outwardly turned flange 50 of tank 34. The brackets 46 may be attached to the plenum by any suitable means, such as by conventional welds to further support and hold the plenum in place.

In accordance with a further feature of this invention, the apparatus is designed so that it may be readily disassembled as, for instance, when the tank or reservoir is to be cleaned and the collected, particulate matter removed therefrom. To this end, and as shown in FIGS. 3 and 8, a quick-release clamp, generally indicated at 52, holds the plenum 30 and the elbow 40 together. This comprises a three-sided clamp welded to the elbow, and the plenum has a vertical collar which fits within the clamp. The fourth side is sealed by a strip with rubber glued to it and is attached to studs 54 on the clamp by wing nuts 56. The plenum and water pan or reservoir may then be separated from the elbow connection by simply releasing the wing nuts and removing.

Separation of the plenum from the water pan can be effected by lifting the support brackets 46 with the attached plenum off the pins 48, and the reservoir can in turn be separated from its support 42, also by lifting. It is within the scope of this invention to provide brackets on the support so that, rather than being lifted from the support, the liquid pan can be slid off the support. Another feature of this invention provides casters 58 positioned on the bottom of the water pan 34 so that after disassembly, the water pan can be rolled across the floor to, for example, a drain. It is within the scope of this invention to provide any other means such as tracks or slides which would similarly ease the task of moving the water pan across the floor.

The water pan can then be cleaned by tilting the pan and dumping the water, with this operation being aided by the outwardly turned flange 50 of the water pan. To further simplify cleaning, if desired, a plastic bag or the like can be positioned within the water pan and held in position, for example, by pins 48. After removal of the water or other liquid, the bag containing the settled particulate matter can then be separated and disposed of and a new bag put in position. The unit is ready again for operation simply by refilling the water pan, assembling as before and adjusting the height of the water to the base of the plenum as required.

To allow for operation over long periods of time where a liquid (such as water) is used which has a substantial evaporation rate, a means of maintaining the requisite liquid level should be employed. While any conventional liquid leveling means can be used, FIGS. 5 through 7 illustrate two suitable means. In the FIG. 5 embodiment, there is provided an airtight liquid container 60, such as a lightweight plastic bottle, mounted on the plenum support brackets 46. A pipe 62 contacts the liquid level at 64; and, when the liquid level decreases, air is drawn into the pipe and container thereby releasing liquid until the liquid level closes off the pipe. A valve 66 is desirably included so that liquid flow through the pipe can be prevented when the container is being filled. A partition or baffle 65 is preferably included so that the liquid leveling means is sensing and adjusting the liquid level in a zone which is substantially free of waves and turbulence.

In the FIG. 6 and 7 embodiment, there is shown an automatic filler or liquid leveler employing a simple float system. A container 70, which may be mounted as in the previous embodiment, has a pipe 72 connected thereto and a lightweight float 74 (e.g.—formed from "Teflon" polytetrafluoroethylene resin—E. I. du Pont de Nemours & Co., Wilmington, Del.) slidably positioned about the pipe with an extension 76 positioned between the float and the container. The pipe 72, which is closed off at its lower end, has two sets of holes, 78 and 80. Holes 78 are positioned so that they are closed off when the liquid level is at the appropriate level. Downward movement of the float 74, caused by a decreasing liquid level, exposes the holes; and liquid is allowed to flow through the holes 78 to raise the liquid level. Holes 80 serve as a drain for any liquid which passes downwardly between the extension 76 and the exterior of the pipe 72. A valve 82 is suitably included for the pipe 72 to allow filling the container 70. A baffle should also preferably by employed to provide a zone substantially free of turbulence for the float.

FIG. 9 illustrates use of the particle-separating apparatus of the present invention in connection with a paper-cleaning apparatus such as is shown in U.S. Pat. No. 3,395,042. A continuous web of paper 90 passes under and adjacent a transversely extending vacuum head 92, the walls of which define a passage therebetween which communicates with a vacuum producing source 94 through a flexible coupling 96. The vacuum source includes an evacuator 98, the outlet of which is connected to the particle-separating apparatus of the present invention, indicated generally at 100 through a flexible coupling 102. A motor drives a fan (not shown) within the evacuator 98 to produce a vacuum in the passage within the head 92. A moveable damper 104 may be interposed between the coupling 96 and the evacuator 98 to control the amount of airflow through the vacuum head. A source of potential 106 produces a stream of ions to neutralize the electrostatic forces between the dust, lint, or other contaminating foreign particles and the paper web 90. As the web 90 continues to move in the direction 108, the neutralized foreign particles will be brushed by the brush 110 thereby loosening the particles from the surface of the paper. The stream of ions is carried along the surface of the web 90 thereby continuously subjecting an area of the surface to a stream of ions, and the loose foreign particles entrapped between the brushes are then sucked through the coupling 96, the evacuator 98 and into the particle-separating apparatus 100 of the present invention where the particles are separated or removed from the air and the clean air vented to the atmosphere.

FIG. 10 shows use of the apparatus of the present invention in connection with the dust collecting apparatus, described and claimed in copending application Ser. No. 24,523, filed Apr. 1, 1970 to Sanders. Powder is applied to a moving surface 120 by a powder sprayer or applicator 122, typically an electrostatic powder sprayer such as is illustrated in U.S. Pat. Nos. 3,273,016, 3,292,045, 3,292,046, 3,341,740 and 3,344,312. The dust collecting apparatus, generally indicated at 124, includes a manifold 126 positioned downstream of the sprayer 122 to entrap the powder particles which are airborne. Air from a source not shown is passed through an air regulator and filter 128 into lines 130 and 132 and through an air or fluid distribution tee 134, located adjacent the center of manifold 126. The distribution tee 134 has orifices 136 (only one side being visible) that direct the air outwardly in both directions. The air stream exiting through the orifices 136 pushes the particles towards the ends of the manifold, and the powder particles are gently withdrawn through exhaust plenums 138, lines 140 and 142 to a blower 144 and then into the dust separating apparatus of the present invention, indicated at 146.

Typically, the commercially available sheet cleaners and dust collecting apparatus which have been described and illustrated in FIGS. 9 and 10 have capacities capable of producing an air throughput of from about 500 to about 800 cubic feet of air per minute. As a representative example, when the air throughput is 600 cubic feet per minute and the size of the plenum inlet is 44.5 square inches (i.e.—a rectangle $7\frac{3}{4}$ inch by $5\frac{3}{4}$ inch), the hood or plenum is desirably sized so that the air velocity at the exit or open base of the hood is less than about 3000 feet per minute. With a velocity of less than 3000 feet per minute, the distance between the base of the hood and the water level should be about $\frac{3}{8}$ inch or less (measured under static conditions prior to air throughput; passage of air through the plenum increases the distance somewhat). With these parameters, the dust separator apparatus was found suitable for removing the dust, lint and other particles from the air streams with no significant difference in result being noticeable when the distance is reduced to $\frac{1}{4}$ inch or the velocity reduced to about 1300 feet per minute. The height of the plenum, with this inlet area and inlet air velocity (600 cubic feet per minute × 144 square inches/ft.$^2$ divided by 44.5 square inches equals a velocity of about 1942 feet per minute) should provide about 2 inches for the initial 110 feet per minute of air velocity at the inlet and an additional inch for each 140 feet per minute. Thus, with a plenum inlet air velocity of 1942 feet per minute, the plenum height should be about 14.4 inches. The plenum outlet should then have a circumference at the outlet which is determined as follows to provide for a maximum air escape velocity of about 3000 feet per minute:

$$\text{Circumference (inches)} = \frac{600 \text{ ft.}^3/\text{min.}}{\frac{(\frac{3}{8} \text{ in.}) (3000 \text{ ft.}/\text{min.})}{144 \text{ in.}^2/\text{ft.}^2}}$$

$$= 76.8$$

While a rectangular or other geometrical shape could be used at the base of the plenum, it has been found suitable to use a square plenum of 19.2 inches on a side since this provides a better distribution of the air stream over the entire plenum outlet area.

Also, in this representative example, it has been found desirable to maintain a distance of about $2\frac{1}{2}$ inches between the sides of the plenum and the water pan walls. With a maximum air escape velocity of about 3000 feet per minute, the waves created by the escaping air are sufficiently subsided at this distance; and, while a greater distance can be used, it is unnecessary, adds to the overall size of the unit and provides a greater opportunity for evaporation of the water. Desirably, the sides of the water pan should extend about 4 inches above the height of the water, and a water level of about 4 inches in depth is suitable.

If desired, the water pan can be equipped with baffles to reduce the turbulence of the water under the plenum; however, this is unnecessary when the configuration of the apparatus is in accordance with the air volume throughput as has been herein described.

Thus, as has been seen, the present invention provides a dust or other particle separating apparatus which is simple and compact in construction yet which achieves efficient separation without reducing the air throughput to any significant degree. This allows the apparatus to be advantageously employed with auxiliary equipment such as paper-cleaning or dust collecting apparatus which generate impure air streams that must be cleaned prior to venting to the atmosphere without affecting the efficiency of the equipment. The use of liquid leveling means with the apparatus of the present invention assures continuing efficiency over relatively long periods of operation. The apparatus is further designed to allow for ready disassembly as, for example, when the particle-entrapping liquid is to be replaced by fresh liquid. Particle separation in excess of 90% can readily be achieved with air streams containing as much as 5 lbs./hr. of particles (far in excess of the amount of particles typically generated by the paper-cleaning and dust collecting apparatus described herein) with the efficiency being retained until about 25 pounds of particles have been trapped.

I claim as my invention:

1. In an apparatus for cleaning the surface of a sheet having lightweight particulate matter thereon, such as dust, antioffset powders, and paper fuzz, which includes an ionizing means to neutralize the electrostatic forces between the particulate matter and the sheet, brush means contacting the sheet to loosen the particulate matter, a vacuum head defining a passage for collection of the particulate matter, a vacuum means to draw the particulate matter in an air stream and a particulate matter separating means for removing the particulate matter separating means including a receptacle containing a particulate matter entrapping liquid, a hood having an inlet to receive an air stream containing particulate matter and an open base and walls defining a chamber, said hood being positionable in telescoping relationship within said receptacle with the liquid level being at a spaced vertical distance of less than about $\frac{3}{8}$ inch from the open base of said hood during static conditions, so that the particles in said air stream impinge on said liquid over the surface area projected by the open base, and means for automatically maintaining the liquid at a level such that the spacing between said hood and said liquid is less than about $\frac{3}{8}$ inch during static conditions, said chamber being sized to permit expansion of the air stream introduced therein to thereby achieve substantially uniform distribution of the air stream as it exits the hood with the circumference of the open base and the spacing of the liquid level being such that the escape velocity of the air stream through the area defined by the circumference of the open base and the liquid level is less than about 3000 ft./min.

2. In an apparatus for removing excess airborne powder following the application of the powder from an applicator to a moving surface which comprises a manifold having a pair of ends and positioned relative to the moving surface and the powder application to entrap at least some of the airborne powder, air distribution means located in the manifold, an air stream for supplying air to the air distribution means to cause the powder to move towards the ends, a plenum adjacent each end of the manifold, means to exhaust the powder from the ends of the manifold through the plenums as powder is removed adjacent the ends and exhaust means to separate powder from the air stream, the improvement comprising an exhaust means for separating the powder including a receptacle containing the powder, an open base and walls defining a chamber, said hood being positionable in telescoping relationship within said receptacle with the liquid level being at a spaced vertical distance of less than about $\frac{3}{8}$ inch from the open base of said hood during static conditions, so that the particles in said air stream impinge on said liquid over the surface area projected by the open base, and means for automatically maintaining the liquid at a level such that the spacing between said hood and said liquid is less than about $\frac{3}{8}$ inch during static conditions, said chamber being sized to permit expansion of the air stream introduced therein to thereby achieve substantially uniform distribution of the air stream as it exits the hood with the circumference of the open base and the spacing of the liquid level being such that the escape velocity of the air stream through the area defined by the circumference of the open base and the liquid level is less than about 3000 ft./min.

* * * * *